United States Patent
Hsu et al.

(10) Patent No.: US 8,134,647 B2
(45) Date of Patent: Mar. 13, 2012

(54) IMAGE PROCESSING METHOD AND APPARATUS

(75) Inventors: Ching-Fu Hsu, Taichung County (TW); Shin-Tai Lo, Miaoli County (TW); Ruey-Shing Weng, Kaohsiung (TW); Jyun-Sian Li, Tainan (TW)

(73) Assignee: Wintek Corporation, Taichung (TW)

( * ) Notice: Subject to any disclaimer, the term of this patent is extended or adjusted under 35 U.S.C. 154(b) by 1159 days.

(21) Appl. No.: 11/937,513

(22) Filed: Nov. 9, 2007

(65) Prior Publication Data
US 2008/0122984 A1 May 29, 2008

Related U.S. Application Data

(60) Provisional application No. 60/864,976, filed on Nov. 9, 2006.

(51) Int. Cl.
*H04N 5/57* (2006.01)
(52) U.S. Cl. .......... 348/687; 348/E5.119; 362/274
(58) Field of Classification Search .......... 348/687, 348/E5.119; 382/274
See application file for complete search history.

(56) References Cited

U.S. PATENT DOCUMENTS

| | | | |
|---|---|---|---|
| 5,325,210 A * | 6/1994 | Takashima et al. | 358/461 |
| 5,929,843 A | 7/1999 | Tanioka | |
| 6,724,934 B1 | 4/2004 | Lee et al. | |
| 6,750,874 B1 | 6/2004 | Kim | |
| 6,897,876 B2 | 5/2005 | Murdoch et al. | |
| 6,954,191 B1 | 10/2005 | Hirano et al. | |
| 6,961,038 B2 | 11/2005 | Yoshinaga et al. | |
| 7,606,415 B2 * | 10/2009 | Ogata et al. | 382/167 |
| 2004/0145792 A1 * | 7/2004 | Maeyama et al. | 359/239 |
| 2004/0201564 A1 * | 10/2004 | Sugino et al. | 345/101 |
| 2004/0234148 A1 * | 11/2004 | Yamada | 382/250 |
| 2006/0007207 A1 * | 1/2006 | Kawaguchi | 345/204 |

* cited by examiner

*Primary Examiner* — Pankaj Kumar
*Assistant Examiner* — Sahar Baig
(74) *Attorney, Agent, or Firm* — Jianq Chyun IP Office

(57) ABSTRACT

The invention provides an image processing method and apparatus thereof. The white component data is extracted from the input R, G, B color data which are the base components of the input image data. A maximum value is extracted from the R, G, B color data and a parameter is generated based on the white component data and the maximum value. The R, G, B color data are multiplied by the parameter to obtain a multiplication result. Subtract the white component data from the R, G, B color data to obtain a subtraction result. The multiplication result and the subtraction result are added together to generate the output R, G, B color data. The output R, G, B color data and the white component data form an output image data with higher brightness.

13 Claims, 3 Drawing Sheets ent signals.

IMAGE PROCESSING METHOD AND APPARATUS

CROSS-REFERENCE TO RELATED APPLICATION

This application claims the priority benefit of U.S. provisional application Ser. No. 60/864,976, filed on Nov. 9, 2006. The entirety of the above-mentioned patent application is hereby incorporated by reference herein and made a part of this specification.

BACKGROUND OF THE INVENTION

1. Field of the Invention

The present invention relates to an image processing method and an apparatus. More particularly, the present invention relates to an image brightness controlling method and apparatus for a display apparatus to enhance image brightness and maintain image hue and saturation.

2. Description of Related Art

If flat panels are used in color display apparatus or color TV sets, the size thereof could be increased. However, as compared with CRT (cathode ray tubes)-type display apparatus, the image brightness of flat panel display apparatus is reduced. In order to overcome disadvantages, a four color component display apparatus based on three base color component signals (red, green, blue) and a white component signal can be used. In order to obtain the white component signal, a white light is passed through or reflected from a white filter, thereby enhancing overall image brightness.

However, according to this technique, it is difficult to maintain the hue and saturation of the original input image signal, because ratio relationship of three base color component signals of the original input image signal is not maintained.

Adding the white component signal to the original three base color component signals to enhance the image brightness will negatively cause the decrease of saturation. In order to overcome the negative effect, it is necessary to adjust the original three base color component signals, so that when the adjusted three color component signals and the white component signal are output or display together, the brightness can still be enhanced and the saturation remains unchanged.

SUMMARY OF THE INVENTION

Accordingly, the present invention is directed to an image processing method and a display apparatus, capable of enhancing the brightness of image such that the saturation remains unchanged.

The present invention provides an image processing method, which includes obtaining a minimum value and a maximum value from a plurality of original base color component signals of an input color signal; obtaining a parameter based on the maximum value and the minimum value; obtaining a white component signal according to the original base color component signals, the maximum value, and the minimum value; multiplying the original base color component signals by the parameter to obtain a multiplication result; adding the multiplication result to the original base color component signals to obtain an addition result; subtracting the white component signal from the addition result to obtain a plurality of output base color component signals; and displaying an output color signal according to the output base color component signals and the white component signal. The output color signal at least comprises the output base color component signals and the white component signal. The brightness of the output base color component signals is higher than the brightness of the original base color component signals.

Further, the present invention further provides an image processing apparatus, which includes a minimum value detector, a maximum value detector, a multiplication module, a division unit, a subtracter, an adder, and a display unit. The minimum value detector obtains a minimum value from the input color signal to define the white component signal, and the input color signal includes a plurality of original base color component signals. The maximum value detector obtains a maximum value from the input color signal. The division unit obtains a parameter based on the maximum value and the white component signal. The multiplication module obtains a multiplication result according to the input color signal and the parameter. The subtracter subtracts the minimum value from the input color signal to obtain a subtraction result. The adder obtains a plurality of output base color component signals according to the multiplication result and the subtraction result. The display unit displays an output color signal according to the output base color component signals and the white component signal. The output color signal at least comprises the output base color component signals and the white component signal, and the brightness of the output base color component signals is higher than the brightness of the original base color component signals.

Further, the present invention also provides an image processing apparatus for processing the input color signal which includes a plurality of original base color component signals. The image processing apparatus includes a first minimum value detector, a maximum value detector, a divider, a multiplier, an adder, a second minimum value detector, a subtracter, and a display unit. The first minimum value detector has an input terminal for receiving the input color signal, and an output terminal for outputting the minimum value of the input color signal. The maximum value detector has an input terminal for receiving the input color signal, and an output terminal for outputting the maximum value of the input color signal. The divider has a first input terminal coupled to the output terminal of the first minimum value detector, a second input terminal coupled to the output terminal of the maximum value detector, and an output terminal. The multiplier has a first input terminal for receiving the input color signal, a second input terminal coupled to the output terminal of the divider, and an output terminal. The adder has a first input terminal for receiving the input color signal, a second input terminal coupled to the output terminal of the multiplier, and an output terminal. The second minimum value detector has a first input terminal coupled to the output terminal of the adder, a second input terminal for receiving a grayscale upper limit, and an output terminal. The subtracter has a first input terminal coupled to the output terminal of the adder, a second input terminal coupled to the output terminal of the second minimum value detector, and an output terminal. The display unit is coupled to the output terminal of the second minimum value detector and the output terminal of the subtracter, for displaying an output color signal. The brightness of the output color signal is higher than the brightness of the input color signal.

In order to make the aforementioned and other objects, features and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The image processing method and the image processing apparatus provided by embodiments of the present invention can enhance the brightness of image and maintain the hue and saturation unchanged. The white component signal is generated according to the input color signal which includes base components R (red), G (green), and B (blue). The generated white component signal and the base component signals are used to generate the adjusted base component signals. The white component signal and the adjusted base component signal constitute a brightness-controlled display signal. Compared with the input color signal, the brightness of the display signal is enhanced, and the saturation remains unchanged.

The minimum value among R, G, and B is selected as the white component signal. Modification to the base component signal can be performed without determining a numerical relationship of the input color, such that the operation complexity is greatly reduced.

First Embodiment

Figure 1:
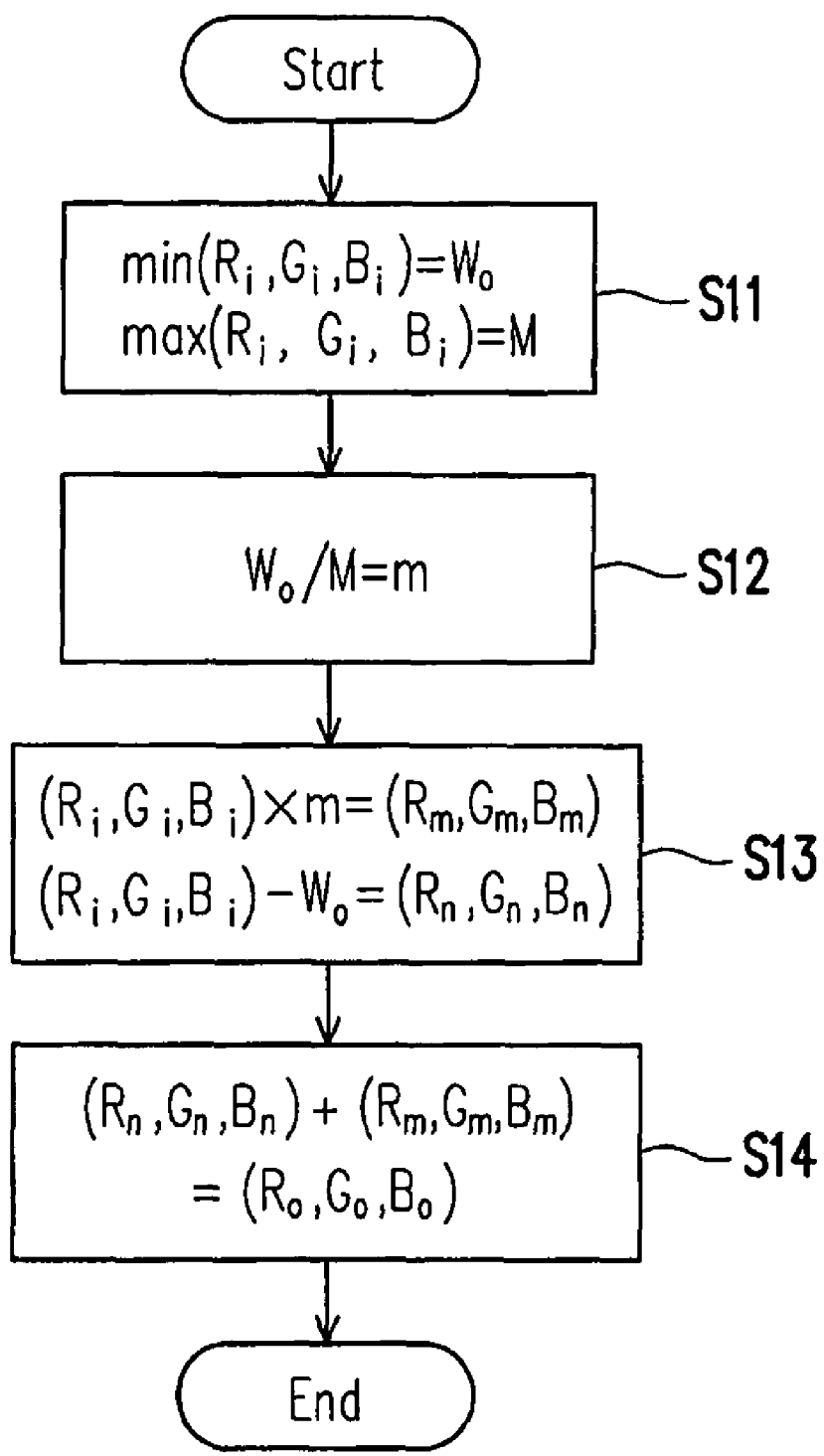
FIG. 1 is a flow chart of an image processing method according to a first embodiment of the present invention.

FIG. 1 shows a flow chart according to the first embodiment of the present invention, and the method of this embodiment is described as follows. In S11, a minimum value is obtained from the input base color component signals (Ri, Gi, Bi), and the minimum value is defined as the white output value (or white component signal) Wo. In addition, a maximum value M is obtained from the base color component signals (Ri, Gi, Bi). In S12, the minimum value Wo is divided by the maximum value M to obtain a ratio value m.

Referring to S13, the input base color component signals (Ri, Gi, Bi) are multiplied by m, respectively, to obtain a multiplication result (Rm, Gm, Bm), and then the white output value Wo is subtracted from the input base color component signals (Ri, Gi, Bi) respectively to obtain a subtraction result (Rn, Gn, Bn).

Referring to S14, the subtraction result (Rn, Gn, Bn) is added to the multiplication result (Rm, Gm, Bm) to obtain processed/adjusted color component signals (Ro, Go, Bo), which are also regarded as output base color component signals wherein m=Wo/M.

$$Ro=Rn+Rm=(1+m)*Ri-Wo=Ri+Rm-Wo=Ri*(Wo/M)+Ri-Wo \quad (1)$$

$$Go=Gn+Gm=(1+m)*Gi-Wo=Gi+Gm-Wo=Gi*(Wo/M)+Gi-Wo \quad (2)$$

$$Bo=Bn+Bm=(1+m)*Bi-Wo=Bi+Bm-Wo=Bi*(Wo/M)+Bi-Wo \quad (3)$$

The adjusted color component signals (Ro, Go, Bo) and the white output value Wo are input together to the display unit, such that the white output value Wo enhances the brightness of the adjusted color component signals (Ro, Go, Bo). The brightness of R, G, B (output color signal) is respectively expressed as:

$$R=Ro+Wo=Ri*(1+Wo/M)=Ri*s \quad (4)$$

$$G=Go+Wo=Gi*(1+Wo/M)=Gi*s \quad (5)$$

$$B=Bo+Wo=Bi*(1+Wo/M)=Bi*s \quad (6)$$

where s=(1+Wo/M).

It is known from the above formulas that the brightness of the color signal after being processed in this embodiment can be enhanced by s rate, and the display signal have the same hue and saturation as the original input signal. That is, the brightness rises by s times while the hue and saturation remain the same. The modification can be performed without determining the numerical relationship of the input color, such that the operation complexity is greatly reduced.

Second Embodiment

Figure 2:
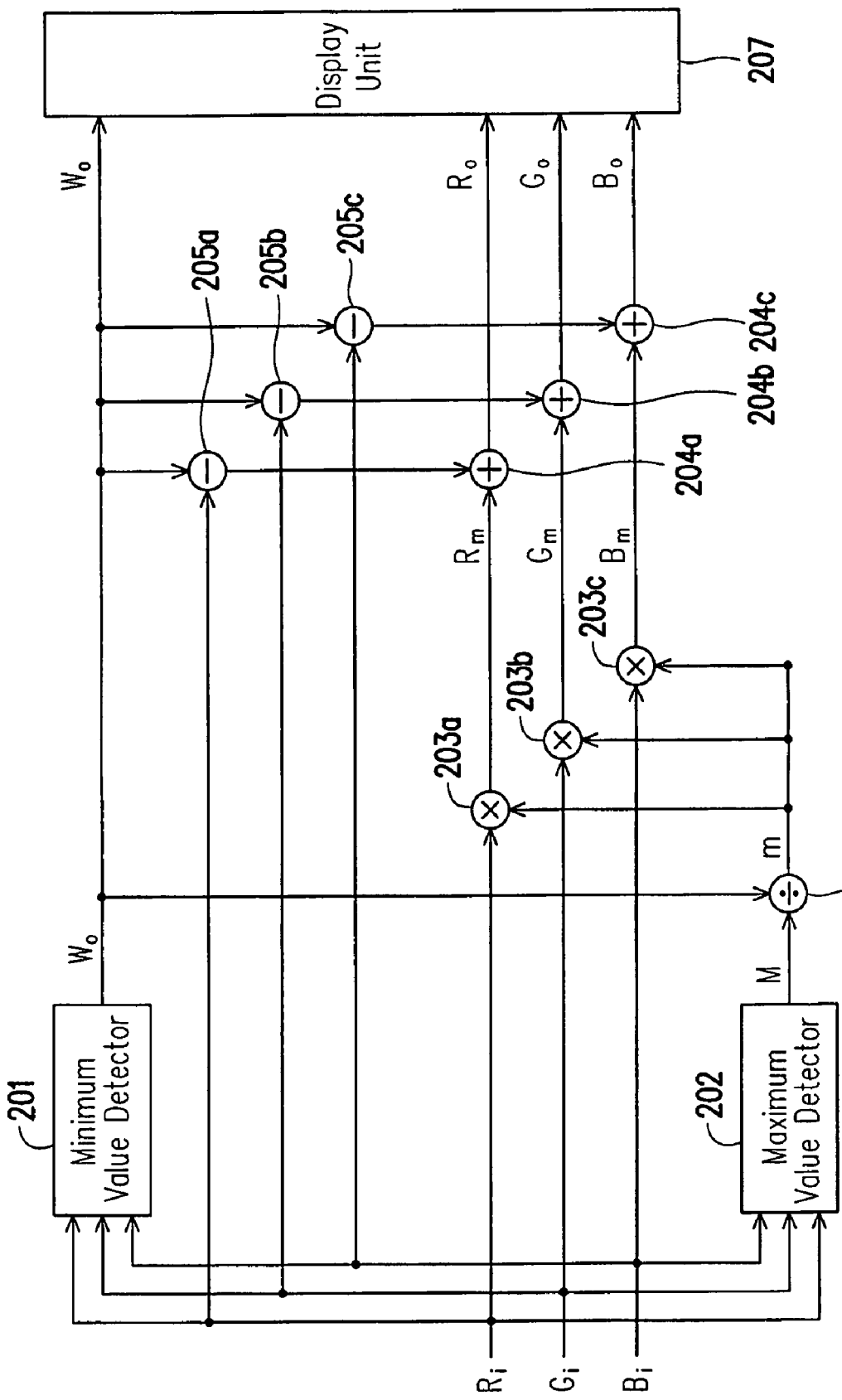
FIG. 2 is a block diagram of an image processing apparatus according to a second embodiment of the present invention.

FIG. 2 is a block diagram of an image processing apparatus according to a second embodiment of the present invention. As shown in FIG. 2, the image processing apparatus includes a minimum value detector 201, a maximum value detector 202, multipliers 203a-203c, adders 204a-204c, subtracters 205a-205c, a divider 206, and a display unit 207. An input color signal to the apparatus includes base component signals R (red), G (green), and B (blue).

The minimum value detector 201 obtains/detects a minimum value from base color component signals (Ri, Gi, Bi) of the input color signal and generates a white component signal Wo based on the minimum value. For example, the white component signal Wo is equal to the minimum value. The maximum value detector 202 may obtain a maximum value M from the base color component signals (Ri, Gi, Bi).

The divider 206 divides the white component signal Wo by the maximum value M to generate a division result m=(Wo/M). The multipliers 203a, 203b, and 203c multiply the base color component signals Ri, Gi, and Bi respectively by the division result m, so as to generate the component signals (multiplication result) Rm(=Ri*m), Gm(=Gi*m), and Bm(=Bi*m).

The subtracters 205a, 205b, and 205c subtract the white component signal Wo from the base color component signals Ri, Gi, and Bi respectively, so as to generate the component signals Rn, Gn, and Bn. The adders 204a, 204b, and 204c respectively synthesize the component signals Rm, Gm, and Bm and the component signals Rn, Gn, and Bn into adjusted base component signals (output base color component signals) Ro, Go, and Bo.

The adjusted base component signals Ro, Go, and Bo are expressed as:

$$Ro=Ri-Wo+Ri*m \quad (7)$$

$$Go=Gi-Wo+Gi*m \quad (8)$$

$$Bo=Bi-Wo+Bi*m \quad (9)$$

Four component signals Ro, Go, Bo, and Wo are display signals input to the display unit 207. The white component signal Wo is used to enhance the brightness of the adjusted base component signals (Ro, Go, Bo). Therefore, the brightness of the output red component signal displayed on the display unit 207 is R=(Ro+Wo)=Ri+Ri*m. The brightness of the output green component signal displayed on the display unit 207 is G=(Go+Wo)=Gi+Gi*m. Similarly, the brightness of the output blue component signal displayed on the display unit 207 is B=(Bo+Wo)=Bi+Bi*m.

Therefore, the brightness ratio of the three output color signal is the same as the brightness ratio of the three original base component signals, such that the hue and saturation of the original image remains unchanged. For example, it is assumed that the input image signals (original base component signals) are:
Ri=50;
Gi=100;
Bi=150;
then, s=(1+m)=1+(50/150)=1.3. In the input image signals, the ratio of brightness of R, G, and B is 50:100:150=1:2:3.

According to the above second embodiment, the adjusted base component signals are:
Ro=16.7;
Go=83.3;
Bo=150;
Wo=50.

Therefore, it is known that in the output image signal, the brightness of R, G and B are (16.7+50=66.7), (83.3+50=133.3), and (150+50=200) respectively. That is, in the output image signal, the brightness ratio of R, G, and B remains 1:2:3.

Three Embodiment

Figure 3:
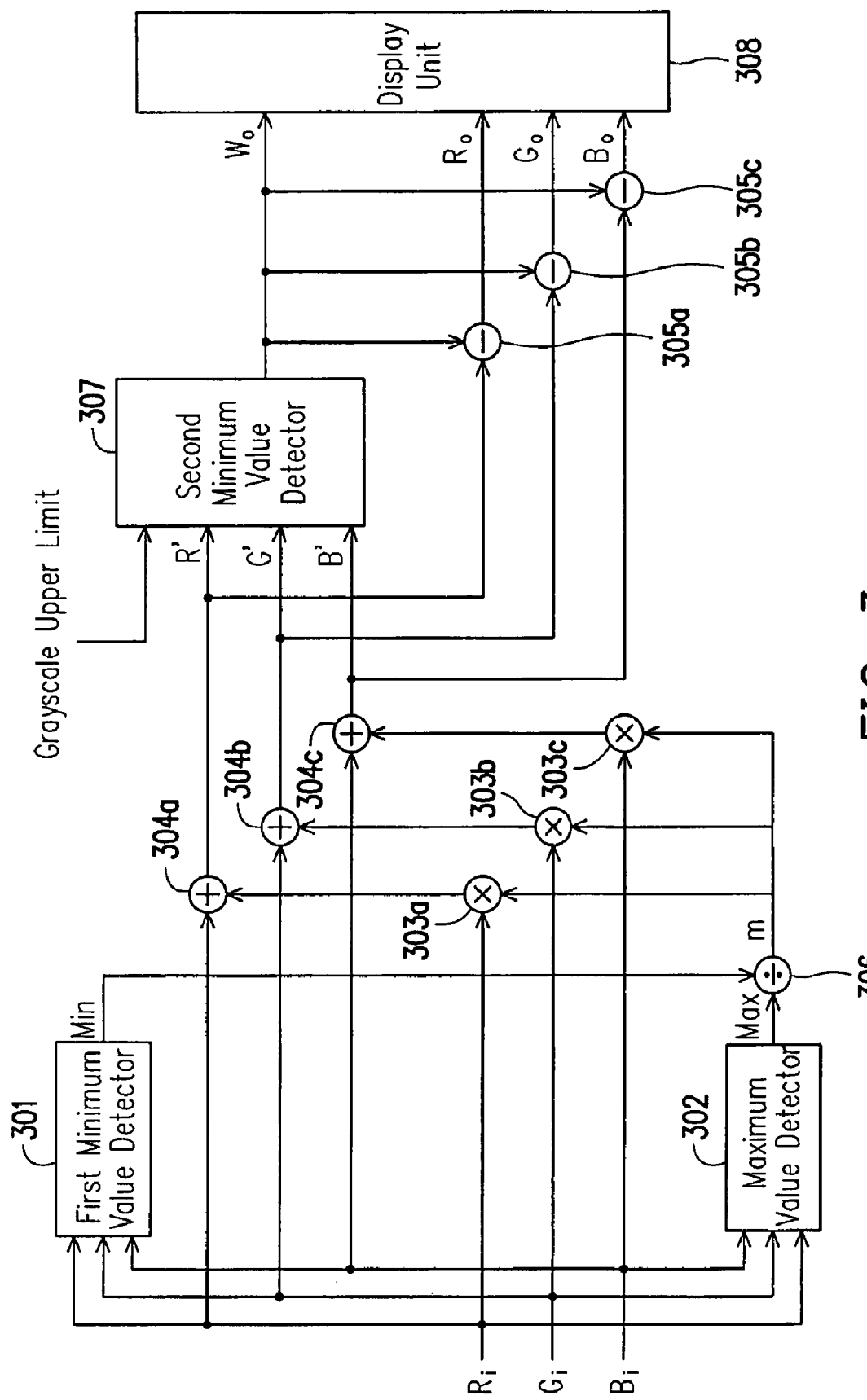
FIG. 3 is a block diagram of an image processing apparatus according to a third embodiment of the present invention.

FIG. 3 is a block diagram of an image processing apparatus according to a third embodiment of the present invention. As shown in FIG. 3, the image processing apparatus includes a first minimum value detector 301, a maximum value detector 302, multipliers 303a-303c, adders 304a-304c, subtracters 305a-305c, a divider 306, a second minimum value detector 307 and a display unit 308. The input color signal to the apparatus includes base component signals R (red), G (green), and B (blue).

The first minimum value detector 301 obtains a minimum value Min from the base component signals (Ri, Gi, Bi). The maximum value detector 302 obtains a maximum value Max from the base component signals (Ri, Gi, Bi).

The divider 306 divides the minimum value Min by the maximum value Max to generate a division result m=(Min/Max). The multipliers 303a, 303b, and 303c multiply the base component signals Ri, Gi, and Bi by the division result m respectively, so as to generate three multiplication results. The adders 304a, 304b, and 304c add three multiplication results to the base component signals Ri, Gi, and Bi respectively, so as to generate the component signals R'=(Ri*(1+m)), G'=(Gi*(1+m)), and B'=(Bi*(1+m)).

The component signals R', G', and B' and the grayscale upper limit (for example, for 8-bit signals, the grayscale upper limit is $2^8-1=255$) are input to the second minimum value detector 307, so as to obtain the minimum value among the four input values to be defined as the white component signal Wo. That is, the equation for the white component signal Wo is related to the base component signals (Ri, Gi, Bi), and Wo=f (Ri, Gi, Bi). Alternatively, Wo may be expressed as Wo=min (R', G', B', grayscale upper limit).

Finally, the subtracters 305a, 305b, and 305c respectively subtract the white component signal Wo from the component signals R', G', and B', so as to generate the adjusted component signals Ro, Go, and Bo.

To sum up, the adjusted signals Ro, Go, and Bo can be expressed as:

$$Ro=Ri-Wo+Ri*m \quad (10)$$

$$Go=Gi-Wo+Gi*m \quad (11)$$

$$Bo=Bi-Wo+Bi*m \quad (12)$$

The four component signals Ro, Go, Bo, and Wo are used as the display signal to be input to the display unit 308. The white component signal Wo is used to enhance the brightness of the adjusted base component signals. Therefore, the brightness of the output red component signal displayed on the display unit 308 is R=(Ro+Wo)=Ri+Ri*m. The brightness of the output green component signal displayed on the display unit 308 is G=(Go+Wo)=Gi+Gi*m. Similarly, the brightness of the output blue component signal displayed on the display unit 308 is B=(Bo+Wo)=Bi+Bi*m.

Therefore, the brightness ratio of the three output color signal is the same as the brightness ratio of the three original base component signals, such that the hue and saturation of the original image are maintained. For example, if it is assumed that the input image signals are:
Ri=50,
Gi=100,
Bi=150,
then, s=(1+m)=1+(50/150)=1.3. In the input image signal, the brightness ratio of R, G, and B is 50:100:150=1:2:3.

According to the above third embodiment, the adjusted component signals are:
Ro=0;
Go=66.33;
Bo=132.83;
Wo=66.67.

Therefore, it is known that in the output image signals, the brightness ratio of output image signal R, G and B is R: (0+66.67=66.67), G: (66.33+66.67=133), and B: (132.83+66.67=199.5) respectively. That is, in the output image signals, the brightness ratio of R, G, and B remains 1:2:3.

Therefore, according to the above example, it is known that by the above embodiments, the brightness ratio of R, G, and B of the input and output image signals remains unchanged (that is the hue and saturation of the color remains unchanged), and the brightness of R, G, and B of the output image signal is enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing method, comprising:
obtaining a minimum value and a maximum value from a plurality of original base color component signals of an input color signal;
obtaining a parameter according to the maximum value and the minimum value;
obtaining a white component signal based on the original base color component signals, the maximum value, and the minimum value;
multiplying the original base color component signals by the parameter to obtain a multiplication result;
adding the multiplication result to the original base color component signals to obtain an addition result;
subtracting the white component signal from the addition result to obtain a plurality of output base color component signals; and
displaying an output color signal according to the output base color component signals and the white component signal, wherein the output color signal at least comprises the output base color component signals and the white component signal, and the brightness of the output base color component signals is higher than the brightness of the original base color component signals.

2. The image processing method as claimed in claim 1, wherein the step of obtaining the white component signal comprises:

defining the minimum value as the white component signal.

3. The image processing method as claimed in claim 1, wherein the original base color component signals of the input color signal comprise red, green, blue component signals.

4. The image processing method as claimed in claim 1, wherein the step of obtaining the parameter comprises:
dividing the minimum value by the maximum value to obtain the parameter.

5. The image processing method as claimed in claim 1, wherein the brightness of the output base color component signals is s rate of the brightness of the original base color component signals, s=1+(min/max), wherein min and max refer to the minimum value and the maximum value respectively.

6. The image processing method as claimed in claim 1, wherein the step of obtaining the white component signal comprises:

$$Wo=\min (R', G', B', UP);$$

$$R'=Ri*(1+m);$$

$$G'=Gi*(1+m);$$

$$B'=Bi*(1+m);$$

wherein Wo is the white component signal, Ri, Gi, and Bi are the original base color component signals respectively, m is the parameter, UP is a grayscale upper limit of the original base color component signals.

7. An image processing apparatus, comprising:
a minimum value detector, obtaining a minimum value from an input color signal to define a white component signal, wherein the input color signal comprises a plurality of original base color component signals;
a multiplication module, obtaining a multiplication result according to the input color signal and a parameter, wherein the parameter is in relation to the minimum value and a maximum value of the input color signal;
a subtracter, subtracting the minimum value from the input color signal;
an adder, obtaining a plurality of output base color component signals based on the multiplication result and the output of the subtracter; and
a display unit, displaying an output color signal according to the output base color component signals and the white component signal, wherein the output color signal at least comprises the output base color component signals and the white component signal, and the brightness of the output base color component signals is higher than the brightness of the original base color component signals.

8. The image processing apparatus as claimed in claim 7, wherein the original base color component signals of the input color signal comprise red, green, and blue signals.

9. The image processing apparatus as claimed in claim 7, wherein the multiplication module comprises:
a maximum value detector, obtaining the maximum value from the input color signal;
a divider, dividing the minimum value by the maximum value to obtain the parameter; and
a multiplier, multiplying the input color signal by the parameter to obtain the multiplication result.

10. The image processing apparatus as claimed in claim 7, wherein the brightness of the output base color component signals is s rate of the brightness of the original base color component signals, s=1+(min/max), wherein min and max refer to the minimum value and the maximum value respectively.

11. An image processing apparatus, for processing an input color signal which comprises a plurality of original base color component signals, comprising:
a first minimum value detector, having an input terminal for receiving the input color signal, and an output terminal;
a maximum value detector, having an input terminal for receiving the input color signal, and an output terminal;
a divider, having a first input terminal coupled to the output terminal of the first minimum value detector, a second input terminal coupled to the output terminal of the maximum value detector, and an output terminal;
a multiplier, having a first input terminal for receiving the input color signal, a second input terminal coupled to the output terminal of the divider, and an output terminal;
an adder, having a first input terminal for receiving the input color signal, a second input terminal coupled to the output terminal of the multiplier, and an output terminal;
a second minimum value detector, having a first input terminal coupled to the output terminal of the adder, a second input terminal for receiving a grayscale upper limit, and an output terminal;
a subtracter, having a first input terminal coupled to the output terminal of the adder, a second input terminal coupled to the output terminal of the second minimum value detector, and an output terminal;
a display unit, coupled to the output terminal of the second minimum value detector and the output terminal of the subtracter, for displaying an output color signal, wherein the brightness of the output color signal is higher than the brightness of the input color signal.

12. The image processing apparatus as claimed in claim 11, wherein the original base color component signals of the input color signal comprise red, green, and blue signal.

13. The image processing apparatus as claimed in claim 11, wherein the brightness of the output color signals is s rate of the brightness of the input color signal, s=1+(min/max), wherein min and max refer to the output signal of the first minimum value detector and the output signal of the maximum value detector respectively.

* * * * *